US012750695B2

(12) United States Patent
Um et al.

(10) Patent No.: US 12,750,695 B2
(45) Date of Patent: Sep. 29, 2026

(54) METHOD FOR DETERMINING NETWORK PARAMETER AND METHOD AND APPARATUS FOR CONFIGURING WIRELESS NETWORK

(71) Applicant: ELECTRONICS AND TELECOMMUNICATIONS RESEARCH INSTITUTE, Daejeon (KR)

(72) Inventors: Jung-Sun Um, Daejeon (KR); Hoi-Yoon Jung, Daejeon (KR); Seok-Ki Ahn, Daejeon (KR); Sung-Jun Ahn, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 377 days.

(21) Appl. No.: 18/448,652

(22) Filed: Aug. 11, 2023

(65) Prior Publication Data

US 2024/0147262 A1 May 2, 2024

(30) Foreign Application Priority Data

Oct. 27, 2022 (KR) ........................ 10-2022-0140272

(51) Int. Cl.
*H04W 24/02* (2009.01)
*H04W 24/08* (2009.01)
*H04W 48/14* (2009.01)

(52) U.S. Cl.
CPC ........... *H04W 24/02* (2013.01); *H04W 24/08* (2013.01); *H04W 48/14* (2013.01)

(58) Field of Classification Search
None
See application file for complete search history.

(56) References Cited

U.S. PATENT DOCUMENTS 10,419,929 B2 9/2019 Dina et al.
11,431,434 B2 8/2022 Ju
2014/0314003 A1* 10/2014 Zhou .................. H04W 40/246 370/329
2017/0111938 A1 4/2017 Gao
(Continued)

FOREIGN PATENT DOCUMENTS

KR 10-2012-0129173 11/2012
KR 10-2015-0046019 4/2015
(Continued)

*Primary Examiner* — Walter J Divito
(74) *Attorney, Agent, or Firm* — KILE PARK REED & HOUTTEMAN PLLC

(57) ABSTRACT

Disclosed herein is a method for determining network parameters. The method includes receiving factory equipment traffic information, unlicensed frequency characteristic information, and factory equipment characteristic information and determining network parameters by taking into account at least one of the factory equipment traffic information, the unlicensed frequency characteristic information, or the factory equipment characteristic information, or a combination thereof, and the network parameters may include at least one of channel access parameters, unlicensed bands/channels, or client grouping, or a combination thereof.

14 Claims, 8 Drawing Sheets

(56) References Cited

U.S. PATENT DOCUMENTS

| | | | |
|---|---|---|---|
| 2017/0339588 | A1 | 11/2017 | Moon et al. |
| 2020/0150971 | A1 | 5/2020 | Liu et al. |
| 2020/0374757 | A1 | 11/2020 | Ljung |
| 2021/0045012 | A1 | 2/2021 | Lee et al. |

FOREIGN PATENT DOCUMENTS

| | | |
|---|---|---|
| KR | 10-2016-0023859 | 3/2016 |
| KR | 10-2016-0052420 | 5/2016 |
| KR | 10-2020-0001344 | 1/2020 |
| KR | 10-2020-0108877 | 9/2020 |

* cited by examiner

| TYPE | TRAFFIC GENERATION FREQUENCY | GENERATED TRAFFIC SIZE | TRAFFIC IMPORTANCE |
|---|---|---|---|
| TrrfficType_1 | H | 1 | HIGH |
| TrrfficType_2 | H | 2 | MEDIUM |
| TrrfficType_3 | M | 3 | MEDIUM |
| TrrfficType_4 | M | 5 | MEDIUM |
| TrrfficType_5 | L | 1 | LOW |
| TrrfficType_6 | L | 5 | LOW |

FIG. 2

METHOD FOR DETERMINING NETWORK PARAMETER AND METHOD AND APPARATUS FOR CONFIGURING WIRELESS NETWORK

CROSS REFERENCE TO RELATED APPLICATION

This application claims the benefit of Korean Patent Application No. 10-2022-0140272, filed Oct. 27, 2022, which is hereby incorporated by reference in its entirety into this application.

BACKGROUND OF THE INVENTION

1. Technical Field

The present disclosure relates generally to technology for configuring a wireless network in a smart factory by using unlicensed spectrum, and more particularly to a method and apparatus for determining and configuring operation parameters of wireless devices forming a network in consideration of traffic characteristics of factory equipment, wireless channel characteristics, the configuration of factory equipment clients, and the like.

2. Description of the Related Art

With the advent of the Fourth Industrial Revolution, an interest in smart factories capable of intelligent manufacturing process management is growing, and it is required to configure a wireless communication network over which all pieces of manufacturing equipment and management devices are capable of being flexibly connected to each other.

As a system or device for configuring a wireless communication network in a smart factory, there may be a system and device based on mobile communication using licensed frequencies. The network configuration of a mobile-communication-based system may incur installation and management costs, but has the advantage of meeting various user requirements.

As an alternative, a network may be configured using an unlicensed wireless communication system or device. The unlicensed wireless communication system or device has an advantage in which costs for the use of frequencies are not incurred, but the quality that users experience may be lower compared to when mobile communication is used, because different wireless devices are required to take a chance before accessing operation channels in unlicensed spectrum.

Therefore, when a wireless network is configured using unlicensed spectrum in a smart factory, it is necessary to configure a network capable of improving the stability of operation. Accordingly, what is required is a method for configuring a network based on unlicensed frequencies through which wireless resources suitable for a smart factory environment can be selected and through which an unlicensed frequency channel access method can be adaptively selected in consideration of factory equipment.

SUMMARY OF THE INVENTION

An object of the present disclosure is to provide a method for determining and configuring operation parameters of wireless communication devices in consideration of the characteristics of factory equipment, the operation status thereof, a wireless channel state in a factory, and the like in order to minimize quality degradation caused by the use of unlicensed frequencies and to improve the stability of wireless communication when a wireless communication network is configured using unlicensed frequencies in a smart factory.

In order to accomplish the above object, a method for determining network parameters according to an embodiment includes receiving factory equipment traffic information, unlicensed frequency characteristic information, and factory equipment characteristic information and determining network parameters by taking into account at least one of the factory equipment traffic information, the unlicensed frequency characteristic information, or the factory equipment characteristic information, or a combination thereof.

The network parameters may include at least one of channel access parameters, unlicensed bands/channels, or client grouping, or a combination thereof.

The channel access parameters may include at least one of a range within which a random number for channel access is to be generated, conditions for the range, or a channel access interval, or a combination thereof.

The unlicensed bands/channels may include unlicensed spectrum or operation channels of unlicensed devices in the unlicensed spectrum.

The factory equipment traffic information may indicate data transferred from a client to an Access Point (AP).

The unlicensed frequency characteristic information may include at least one of channel quality of a wireless link, or a utilization rate of each operation channel, or a combination thereof.

The factory equipment characteristic information may include at least one of the number of pieces of factory equipment, the number of clients connected to the pieces of factory equipment, or the total number of traffic types of a traffic unit generated by the pieces of factory equipment, or a combination thereof.

Also, in order to accomplish the above object, a method for configuring a wireless network according to an embodiment may include receiving at least one of information about functions supported by an Access Point (AP), factory equipment information, or information about an installation location in a factory, or a combination thereof, configuring an initial network based on at least one of the information about the functions supported by the AP, the factory equipment information, or the information about the installation location in the factory, or a combination thereof, transmitting information about the configuration of the initial network to the AP, updating parameter information required for a network configuration based on a network access request of a client and information required for the network configuration, which are received through the AP, and transferring the updated parameter information to the client via the AP.

The AP may transfer parameter information arbitrarily determined based on the information about the configuration of the initial network to the client.

The AP may configure an operation channel and channel access parameters based on the information about the configuration of the initial network, and, using a beacon, the AP may transfer information to a client that intends to access the AP.

The client may receive the information and access the AP, thereby making a request for access to the network configuration.

In response to the request for access, the AP may make a request for the information required for the network configuration to the client.

In response to the request, the client may transfer the information required for the network configuration to the AP.

The client may receive the information and transfer the request for access to the network configuration and the information required for the network configuration to the AP by accessing the AP.

The method may further include collecting channel monitoring result information during data transmission and reception between the AP and the client or after the data transmission and reception, receiving channel quality estimation information of the client and traffic-type-related information, receiving terminal channel quality collection information for the client, which is received in response to a request from the AP, from the AP, and updating parameters based on at least one of the channel monitoring result information, the channel quality estimation information of the client, the traffic-type-related information, or the terminal channel quality collection information, or a combination thereof.

The method may further include transferring the updated parameters to the client via the AP.

Also, in order to accomplish the above object, an apparatus for configuring a wireless network according to an embodiment includes memory in which a control program for configuring a wireless network is stored and a processor for executing the control program stored in the memory. The processor may receive at least one of information about functions supported by an AP, factory equipment information, or information about an installation location in a factory, or a combination thereof, configure an initial network based on at least one the information about the functions supported by the AP, the factory equipment information, or the information about the installation location in the factory, or a combination thereof, and transmit information about the configuration of the initial network to the AP.

The processor may update the parameter information required for the network configuration based on the network access request of the client and the information required for the network configuration, which are received through the AP, and transfer the updated parameter information to the client via the AP.

The AP may transfer parameter information arbitrarily determined based on the information about the configuration of the initial network to the client.

The AP may configure an operation channel and channel access parameters based on the information about the configuration of the initial network, and, using a beacon, the AP may transfer information to a client that intends to access the AP.

The client may receive the information and access the AP, thereby making a request for access to the network configuration.

In response to the request for access, the AP may make a request for the information required for the network configuration to the client.

In response to the request, the client may transfer the information required for the network configuration to the AP.

The client may receive the information and transfer the request for access to the network configuration and the information required for the network configuration to the AP by accessing the AP.

The processor may collect channel monitoring result information during data transmission and reception between the AP and the client or after the data transmission and reception, receive channel quality estimation information of the client and traffic-type-related information, receive terminal channel quality collection information for the client, which is received in response to a request from the AP, from the AP, and update parameters based on at least one of the channel monitoring result information, the channel quality estimation information of the client, the traffic-type-related information, or the terminal channel quality collection information, or a combination thereof.

The processor may transfer the updated parameters to the client via the AP.

BRIEF DESCRIPTION OF THE DRAWINGS

The above and other objects, features, and advantages of the present disclosure will be more clearly understood from the following detailed description taken in conjunction with the accompanying drawings, in which:

FIG. 2 is a view illustrating categories and definitions of types depending on traffic characteristics of factory equipment according to an embodiment;

DESCRIPTION OF THE PREFERRED EMBODIMENTS

Figure 1:
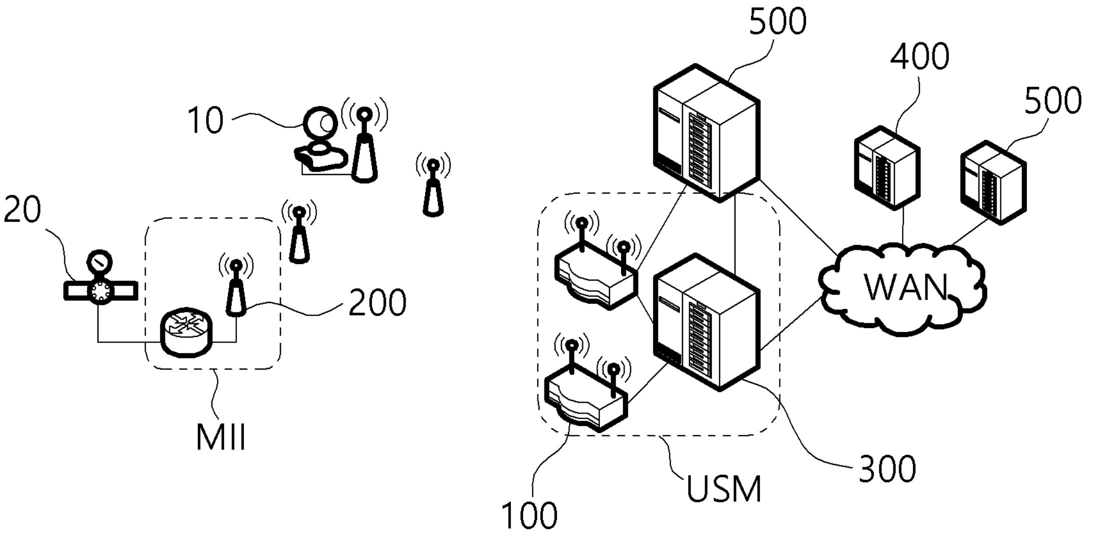
FIG. 1 is a configuration diagram of a system for configuring a wireless network in a smart factory according to an embodiment.

The advantages and features of the present disclosure and methods of achieving them will be apparent from the following exemplary embodiments to be described in more detail with reference to the accompanying drawings. However, it should be noted that the present disclosure is not limited to the following exemplary embodiments, and may be implemented in various forms. Accordingly, the exemplary embodiments are provided only to disclose the present disclosure and to let those skilled in the art know the category of the present disclosure, and the present disclosure is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present disclosure.

The terms used herein are for the purpose of describing particular embodiments only and are not intended to limit the present disclosure. As used herein, the singular forms are intended to include the plural forms as well, unless the context clearly indicates otherwise. It will be further understood that the terms "comprises," "comprising,", "includes" and/or "including," when used herein, specify the presence of stated features, integers, steps, operations, elements, and/or components, but do not preclude the presence or addition of one or more other features, integers, steps, operations, elements, components, and/or groups thereof.

Unless differently defined, all terms used herein, including technical or scientific terms, have the same meanings as terms generally understood by those skilled in the art to which the present disclosure pertains. Terms identical to those defined in generally used dictionaries should be interpreted as having meanings identical to contextual meanings of the related art, and are not to be interpreted as having ideal or excessively formal meanings unless they are definitively defined in the present specification.

In the present specification, each of expressions such as "A or B", "at least one of A and B", "at least one of A or B", "at least one of A, B, and C", and "at least one of A, B, or C" may include any one of the items listed in the expression or all possible combinations thereof.

Hereinafter, embodiments of the present disclosure will be described in detail with reference to the accompanying drawings. In the following description of the present disclosure, the same reference numerals are used to designate the same or similar elements throughout the drawings, and repeated descriptions of the same components will be omitted.

FIG. 1 is a configuration diagram of a system for configuring a wireless network in a smart factory according to an embodiment.

Referring to FIG. 1, the system for configuring a wireless network according to an embodiment may include an Access Point (AP) 100, a client 200, and a network configuration apparatus 300. Here, the system for configuring a wireless network in a smart factory may be configured based on a wireless LAN.

The AP 100 may be connected to the Internet network or a device for controlling or managing a network. The AP 100 may be referred to as a master or a master module.

The client 200 is a device connected to a factory sensor 10 for managing or monitoring a working process or to factory equipment 20, and may indicate a device that communicates with the AP 100. The client 200 may be referred to as a station (STA), a terminal, a user, or factory equipment.

The network configuration apparatus 300 according to an embodiment may include a Multi-Link Management (MLM) function or an MLM system (MLMS) for configuring and managing wireless links. The MLM function or system may determine the unlicensed spectrum to be used by wireless devices in the factory or channels in the unlicensed spectrum, or may control the operation of the wireless devices. The MLM function may be implemented by being included in an AP module, or may be implemented as an independent system or module.

The network configuration apparatus 300 according to an embodiment may be commonly called an MLMS.

The system for configuring a wireless network according to an embodiment may include a Machine-IP Interface (MII), which is a function or device for making data, such as information, traffic, or messages generated by factory equipment or provided thereto, interwork with an Internet Protocol (IP).

The MII may be applied to factory equipment that is manufactured without any consideration of an Internet connection or factory equipment that transmits and receives data using a protocol other than the Internet Protocol. The MII may be implemented by being included in a client, or may be implemented as an independent module so as to be connected between factory equipment and the client.

The system for configuring a wireless network according to an embodiment may include an Unlicensed Spectrum Monitoring (USM) function or device for monitoring an environment in which unlicensed frequencies are used in a factory. The USM function may be implemented by being included in the AP 100, or may be implemented as an independent module. The AP 100 or the independent module for performing the USM function may operate by being connected to the network configuration apparatus 300.

The system for configuring a wireless network according to an embodiment may include an Automated Frequency Coordination System (AFCS) 400. The AFCS 400 may perform a function for providing information required for the use of a 6 GHz band in the unlicensed spectrum.

The system for configuring a wireless network according to an embodiment may include devices for edge computing 500. The devices for edge computing 500 may perform a function of controlling and managing smart factory equipment and/or processes. Here, edge computing 500 means that control and management are performed in a server or system as close as possible to a factory site. An edge computing module may be included in the internal network of the factory by being connected to the AP or the network configuration apparatus 300, or may be included in a network outside the factory through the Internet network.

Meanwhile, the technology proposed in an embodiment of the present disclosure relates to a method for determining and configuring parameters related to the use of wireless network resources by the AP 100 and the client 200. Particularly, the wireless resources intended to be used are assumed to be unlicensed spectrum.

Unlicensed frequencies may be used by being shared between homogeneous or heterogeneous wireless devices. Accordingly, in order to enable the devices to fairly use the resources, a fair opportunity of accessing channels has to be given to the devices.

For the wireless network configuration, an embodiment presents a method for determining operation parameters depending on the traffic characteristics of factory equipment, unlicensed frequency characteristics at a factory site (including the current status of the use thereof), factory equipment configurations, and the like. An embodiment related to the parameters may include an unlicensed band in which wireless devices are to operate, wireless resources including operation channels in the unlicensed band, channel access parameters for using unlicensed frequencies, and client grouping.

The method for determining network parameters may be performed by an apparatus for determining network parameters. The apparatus for determining network parameters may be configured as a computing device. The computing device may include memory and a processor, and a detailed description of the configuration thereof will be omitted.

The apparatus for determining network parameters may receive factory equipment traffic information, unlicensed frequency characteristic information, and factory equipment characteristic information and determine network parameters by taking into account at least one of the factory equipment traffic information, the unlicensed frequency characteristic information, or the factory equipment characteristic information, or a combination thereof. Here, the network parameters may include at least one of channel access parameters, unlicensed bands/channels, or client grouping, or a combination thereof.

More specifically, the parameters related to a network configuration may include parameters for channel access, which is performed before a wireless communication device transmits a signal, as an embodiment. The channel access parameters may include at least one of a range within which a random number for channel access is to be generated, conditions for the range, or a channel access interval, or a combination thereof.

The random number for channel access is a natural number, and if an operation channel is not occupied for a designated channel access determination unit time corresponding to the natural number, a wireless device transmits data or a signal. If signal transmission by another wireless device is detected in the meantime, a reduced random number at the corresponding time is saved, and when the channel is not used again, the above operation is repeated. Here, before the operation is repeated, channel access has to be restricted for a certain time period, in which case the channel access interval is added to a fixed time.

The channel access interval is also defined as a natural number, and as many channel access intervals as a channel access interval number may be formed in the channel access determination unit time. In an embodiment, the above-mentioned range within which a random number for channel access is to be selected is referred to as a ‘random number generation range’ hereinbelow.

The random number generation range may be predefined, or the initial value thereof may be set. When data or a signal is transferred because the random number for channel access satisfies a defined condition such as 0 or the like, if it is determined that the counterpart radio station does not receive the data or signal normally, the random number generation range is updated. Through the update, the random number generation range may be set to twice the original value. However, continuously increasing the random number generation range to twice the original value may degrade the quality of data transmission, so the maximum number for update may be defined.

In an embodiment, an initial value of the generation range and a maximum value for the generation range, up to which the generation range is allowed to increase, may be defined as the conditions for the generation range. Accordingly, an embodiment may include a method for configuring the channel access interval, the initial value of the generation range, and the maximum value for the generation range as channel access parameters.

The parameters related to a network configuration may include parameters for wireless resources for forming a communication link between the AP 100 and the client 200 as an embodiment. The wireless resources may be unlicensed frequency bands or operation channels of unlicensed devices in the respective unlicensed frequency bands. As an embodiment, the unlicensed frequency bands may be 2.4 GHz, 5 GHz, and 6 GHz bands.

The operation channels may have different center frequencies, and the channel bandwidth thereof may be one of 20 MHz, 40 MHz, 60 MHz, 80 MHz, 160 MHz, 240 MHz, and 360 MHz. Accordingly, a method for configuring unlicensed bands and operation channels as wireless resource parameters may be included in an embodiment. Here, the number of unlicensed bands and the number of operation channels may vary from the aspect of management by the network configuration apparatus (or from the aspect of a network) or from the viewpoints of the AP and the client.

From the viewpoints of the AP 100 and the client 200, the number of operation channels and the number of unlicensed bands are determined depending on the number of wireless channels for transmission and reception simultaneously supported by a wireless communication device. More specifically, the numbers are determined depending on the number of operation channels capable of being simultaneously supported and the number of simultaneously supported unlicensed bands in which the number of simultaneously supported operation channels is taken into account.

Multiple APs 100 may form different Basic Service Sets (BSSs) and use different channels. Accordingly, from the viewpoint of the network configuration apparatus, the numbers may be more increased.

In order to maximize wireless communication quality, the network configuration apparatus 300 may configure resources so as to be suitable for the number of channels supportable by each of the APs 100 while minimizing mutual interference between the different BSSs of the APs. In the case of the unlicensed bands of 2.4, 5, and 6 GHz defined as an embodiment, the output levels thereof, the conditions for the use thereof, and the like may be limited depending on the technical standard defined in each country. Also, operation channels in the same unlicensed band may have different output levels depending on a subdivided band in the unlicensed band. Therefore, the unlicensed band and the operation channels may be determined in consideration of channel bandwidth, the distance a radio wave can reach, the technical standard, and the like required for a network configuration.

The parameters related to a network configuration may include grouping one or more clients 200 by the AP 100 as an embodiment. Grouping is performed in such a way that the AP 100 groups the pieces of client equipment 200 having similar characteristics, whereby network management efficiency may be improved. From another aspect, any information that the AP 100 transfers to terminals is transmitted to each group, whereby resources may be efficiently used. That is, information is transmitted using multicast or groupcast, rather than unicast for transmission to a single terminal, whereby the use of time resources may be minimized.

Accordingly, a group may be formed in consideration of various conditions such as the location of factory equipment, the characteristics thereof, traffic characteristics, and the like. When a group is formed, the clients 200 that can be included therein may change depending on the number of clients that can be managed in a single operation channel by being included in the group. Also, the clients 200 to be grouped together may be identified depending on the traffic characteristics or type or on the level at which the transmission signal of each AP is received.

Factors that can be considered when one or more of the above-described network configuration parameters are determined will be described below.

An embodiment of the factors considered for the network operation parameter configuration may include traffic generated by factory equipment. ‘Factory equipment traffic’ indicates data transferred from the client 200 to the AP 100. Conversely, traffic transferred from the AP 100 to the client 200 or traffic for controlling factory equipment through the client 200 may be referred to as ‘control traffic’.

In an embodiment, the ‘factory equipment traffic’ or the ‘control traffic’ may be called ‘traffic’. In an embodiment, the ‘traffic’ may be considered as a main factor for a network configuration. With regard to this, criteria for classifying traffic types (type classification criteria) may be defined, and the pieces of factory equipment to form a network may be classified depending on the traffic types based on the criteria.

As an embodiment, the type classification criteria may be defined using vectors for multiple characteristics. A vector space is separated by multiple axes (or a feature, a range, and a type). Each of the characteristics of traffic is defined on each axis. The 'traffic type' is determined depending on the area indicated by the vectors formed by the values of the characteristics defined on the axes. In an embodiment, the type classification criteria are defined using three characteristics on the vector axes, which are a traffic generation frequency, a generated traffic size, and traffic importance.

As an embodiment, six initial traffic types are defined based on the space indicated by vectors and described as shown in FIG. 2.

FIG. 2 is a view illustrating categories and definitions of types depending on traffic characteristics of factory equipment according to an embodiment.

As illustrated in FIG. 2, the traffic type may be used as a value to be initially applied in a network configuration apparatus or the like. The initially set value may be updated based on information collected from a client 200 or an AP 100 or through USM in a network operation and management process. That is, a section area in the vector space for classifying the traffic type may be changed depending on the collected information. Alternatively, the section area in the vector space for classifying the traffic type is maintained the same, but a value on each axis for each piece of factory equipment is changed, whereby the traffic type of the factory equipment may be changed.

Figure 3:
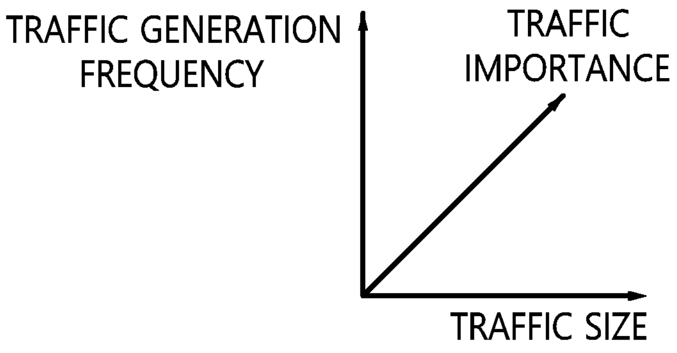
FIG. 3 is a graph illustrating criteria information for classifying traffic types according to an embodiment.

FIG. 3 is a graph illustrating criteria information for classifying traffic types according to an embodiment.

As illustrated in FIG. 3, the traffic importance may be determined based on the traffic generation frequency and the traffic size.

Figure 4:
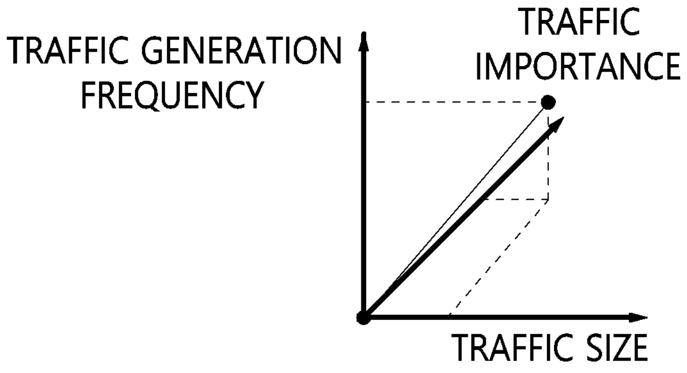
FIG. 4 is a graph illustrating the traffic importance of TrafficType_1 according to an embodiment.
Figure 5:
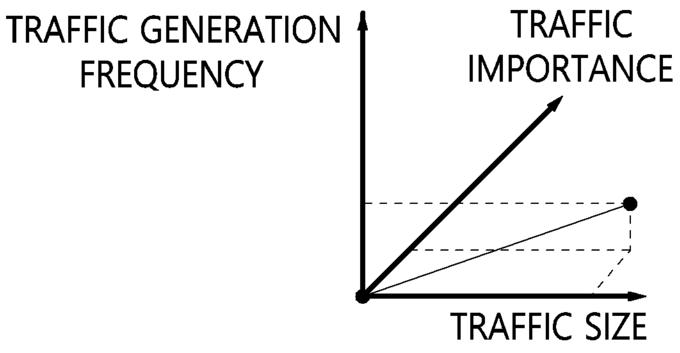
FIG. 5 is a graph illustrating the traffic importance of TrafficType_6 according to an embodiment.

FIG. 4 is a graph illustrating the traffic importance of TrafficType_1 according to an embodiment, and FIG. 5 is a graph illustrating the traffic importance of TafficType_6 according to an embodiment.

As illustrated in FIG. 4, it can be seen that the traffic importance of TrafficType_1 is higher than reference traffic importance. Conversely, it can be seen that the traffic importance of TrafficType_6 is lower than the reference traffic importance, as illustrated in FIG. 5.

An embodiment of the factors considered for the network operation parameter configuration may include unlicensed frequency characteristics at a factory site. Here, the frequency characteristics may include the channel quality of a wireless link, the utilization rate of each operation channel, and the like. The channel quality may be evaluated using the characteristics of radio propagation between an AP and each client, and as an embodiment, the channel quality may be configured with a combination of one or more of the strength of a received signal, radio propagation loss, channel frequency response characteristics, or channel time response characteristics, or a combination thereof.

The AP 100 may determine the above-mentioned information based on the signal received from the client 200, or may acquire the same from data that is transferred after being formed as a response message by the client 200. The AP 100 may check or receive the information and transfer the same to a module or system for performing a multi-link management system (MLMS) function. The channel utilization rate may indicate the utilization rate of each unlicensed band channel used/occupied by a wireless device participating in the network configuration or by a wireless device of another network in a nearby region. The channel utilization rate may be calculated as 'average[(channel occupancy time)/(channel observation time)]' as shown in Equation (1):

$$O_k = \frac{1}{M}\sum_{m=0}^{M-1}\frac{T_O(m)}{T_N(m)} \tag{1}$$

As an embodiment, the channel observation time may be defined as $T_N$ seconds for each channel having the bandwidth of 20 MHz. Determination of channel occupancy may be performed by the AP 100 itself in the middle of data transmission, performed by the client 200, or performed by a USM device for monitoring only the channel occupancy state, or one or more of these devices perform the determination, whereby pieces of data may be combined. Out of $T_N$ seconds, the time during which the channel is occupied is $T_O$ seconds. For the channel k, the channel occupancy state is determined based on the average of the M channel occupancy times. The resultant data may be acquired in a module or system for performing the MLM function. Here, M, $T_N$ seconds, and the like may be variably defined by a user or an administrator. The channel utilization rate information may be used or managed using the actual values acquired through calculation. Alternatively, the actual value of the channel utilization rate is defined as a certain unit and converted into an index value, and may then be used or managed.

An embodiment of the factors considered for the network operation parameter configuration may include factory equipment characteristics. The factory equipment characteristics may be defined as one or more of the number of pieces of factory equipment, the number of clients 200 connected to factory equipment, or the total number of traffic types of a traffic unit generated by each piece of factory equipment, or a combination thereof. The factory equipment characteristic information may be defined by an installer or the like at the initial step of the network configuration.

As another embodiment, the factory equipment characteristics may be checked based on information included in a message that the client 200 transfers at the initial step in order to access the AP 100 or a network. The information transferred from the client 200 may be received by the AP 100 and forwarded to the module or system for performing the MLM function. Information capable of being contained in a factory equipment characteristic information message may be formed by including at least one of identification information of equipment and/or a traffic link, traffic type information, factory equipment information, factory equipment client information, or other information, or a combination thereof.

Here, an interpretation of a value for each of the above-mentioned pieces of information or values corresponding to the information states may be input by a network installer, or may be determined by a configuration information program at an upper level.

The identification information of equipment and/or a traffic link is used in order for the network configuration apparatus to manage a wireless link or resources for each piece of factory equipment or to manage the same for each traffic link. Because traffic units having different characteristics may be present even in a single piece of equipment, they are identified using traffic links. Here, the traffic may be limited to traffic at the upper stage generated in the equipment, and traffic related to the operation of a client corresponding to a wireless communication device is not included therein. At least one traffic link may be configured for each piece of factory equipment. Here, multiple traffic links may be assigned to a single operation channel, but they may be configured by being separated by multiple operation channels of one or more bands depending on information that should be considered for the configuration of other parameters.

The traffic type is information for defining the traffic characteristics of a traffic link. Here, the traffic characteristics may be defined as including or being the same as the above-described factory equipment characteristics. Accordingly, as an embodiment, an arbitrary value of the traffic type information may correspond to the traffic type of FIG. 2. The correspondence relationship between the arbitrary value and the actual type may be directly defined by a network installer or administrator, as described above, or may be determined depending on a wireless device or a network configuration/driving program at the upper level.

The factory equipment information may include information that is required to be considered in connection with the configuration of wireless resources of a network or the transfer of control information. As an embodiment, when the operation of any piece of factory equipment has priority over the other pieces of equipment in terms of management, information thereabout may be included in a message. The network configuration apparatus 300 is able to manage the network configuration to avoid a problem that can be caused when factory equipment uses unlicensed frequencies.

The factory equipment client information defines a range within which a wireless client device can operate a function, and the like. For example, the number of unlicensed bands simultaneously available for transmission and reception, the number of operation channels in each of the bands, the range of the operation channel, information about whether channel access parameters are controllable, and the like may be included.

Hereinafter, a method for determining network configuration parameters based on information considered for a parameter configuration will be described.

Network configuration parameters may be determined so as to maximize the overall network transmission quality (e.g., performance such as a transmission speed, a transmission rate, a transmission delay, and the like) and to maximize the fairness of the use of resources based on the priority order of wireless devices.

Here, the number of available wireless channels may be defined as a constraint. The number of wireless channels may be limited for fair use of resources when other adjacent networks are present. Alternatively, it may be limited depending on the number of channels supportable by the AP 100 or the network configuration apparatus 300.

As an embodiment, maximization of the overall network transmission quality may be defined as shown in Equation (2):

$$\max f(\text{Ch\_n}, \text{Ch\_p}(f), \text{Ch\_q}(f), \text{Op\_1}(f), \text{Op\_2}(f), \ldots, \text{Op\_n}(f)) \quad (2)$$

Here, Ch_n denotes the total number of available channels, Ch_p(f) denotes transmission power available in each channel, and Ch_q(f) denotes the channel state information of a channel having a center frequency of f. The channel state information may include fading characteristics, an interference level, a response error rate, and the like. Op_1(f) to Op_n(f) define different constituent characteristics of the channel. For example, the number of terminals or traffic units for each channel, the characteristic information of each traffic unit, transmission priority, channel access parameters, and the like may be included.

In another definition method, transmission quality is maximized using only 'max f(Ch_n, Ch_p(f), Ch_q(f))' by defining all Op_n(f) as fixed constraints. Alternatively, the method may be defined such that transmission quality is maximized by defining 'max f(Ch_n, Ch_p(f), Ch_q(f), RpOp(f))' and substituting a single representative function, that is, RpOp(f), for multiple constituent characteristic functions.

The fairness of the use of the same channel may be optimized by reflecting the importance of equipment, rather than simply regarding all pieces of equipment as having the same conditions. Here, the importance of equipment may be checked using information included in the factory equipment characteristic information. The fairness may be determined by considering all pieces of equipment, or may be determined in units of operation channels.

As an embodiment, when clients 200 and an AP 100 are defined as n nodes, parameters may be determined as shown in Equation (3) such that the fairness based on channel access parameters, operation channel information, and the like considered for the first to n-th nodes is maximized.

$$\max g(Op(n), Ch(n)) \quad (3)$$

Here, Ch(n) is information about a channel on which the n-th node is operating, and may be applied as a variable or a fixed value may be applied as a constraint. When the information about the channel is defined as a fixed constraint, the configuration information of other nodes assigned to the operation channel is considered together such that fairness is maximized only for the operation channel on which the n-th node is operating, and parameters may be set as shown in Equation (4):

$$\max g(Op(n)) \quad (4)$$

Here, channel access parameters, traffic characteristics, and the like may be considered for Op(n). Also, fairness may be calculated in consideration of a coefficient when equipment is determined to have high importance based on the factory equipment characteristic information. Also, a generation frequency, the rate based on the amount of traffic, and the like may be considered as the traffic characteristics. Here, the coefficient value based on a traffic type may be reflected in the amount of traffic. As an embodiment, when the n-th traffic unit is x(n), fairness may be calculated as a(n)x(n) in consideration of the coefficient.

As an embodiment of a method for configuring or determining parameters, parameters may be configured according to sequential determinations.

Figure 6:
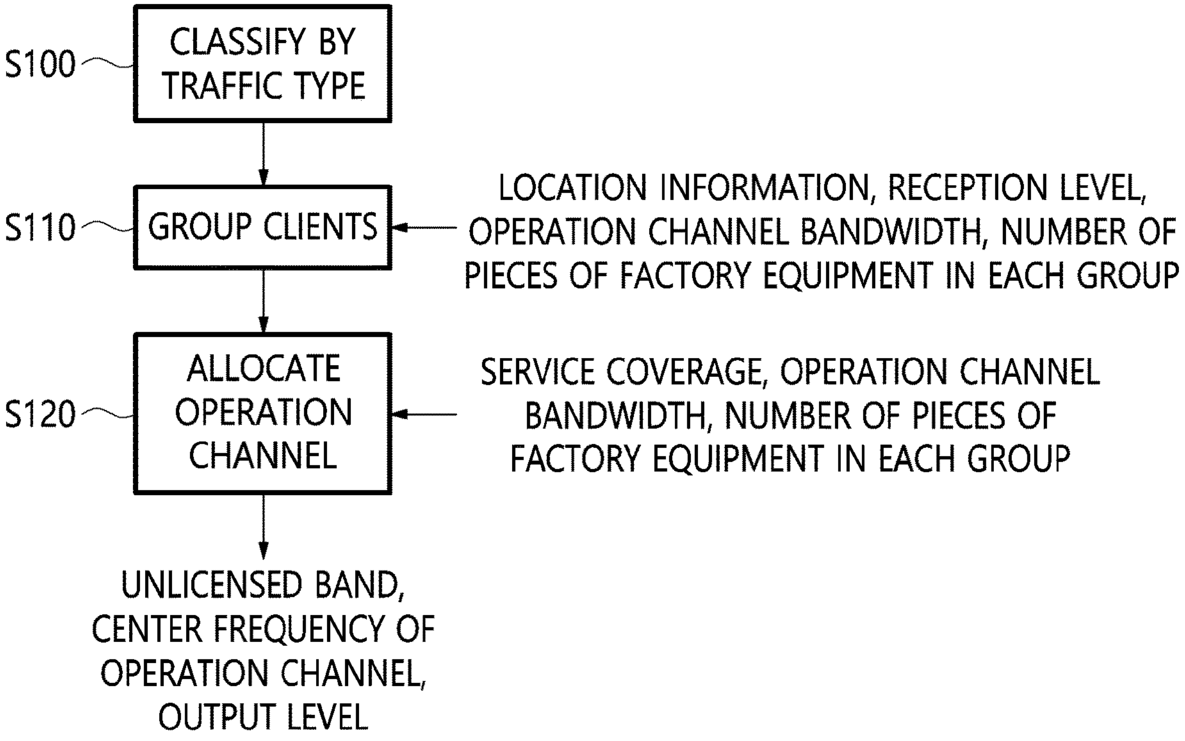
FIG. 6 is a flowchart illustrating a network configuration operation procedure according to an embodiment.

FIG. 6 is a flowchart illustrating a network configuration operation procedure according to an embodiment.

As illustrated in FIG. 6, operation channels for an AP and clients are determined, after which channel access parameters in which fairness is taken into account may be determined for each of the operation channels. When the operation channels are determined, pieces of factory equipment may be grouped first. An embodiment of the operation channels according to grouping is as follows.

First, the same pieces of factory equipment are classified depending on the traffic type at step S100. Groups are classified such that each operation channel is assigned a suitable number of pieces of factory equipment at step S110. Here, classification may be performed depending on geographical characteristics, and location information or the strength of a signal from the AP may be used therefor. The number of pieces of factory equipment in each group in the state in which a single traffic type is used in a single operation channel may be defined so as to differ from that in the state in which multiple traffic types are used in the corresponding operation channel. The unlicensed band and operation channels to be used by the formed group(s) may be determined depending on service coverage, an output level required for each channel, operation channel bandwidth, the characteristics of adjacent channels, requirements for the operation channel, the number of pieces of factory equipment in the group, and the like at step S120.

Then, channel access parameters for the operation channel may be configured as follows. The channel access parameters are determined depending on the factory equipment traffic type in the formed operation channel, factory equipment characteristic information, the number of pieces of factory equipment in a group, and the like. When only a single traffic type is formed, all of a channel access interval, an initial value of a generation range, and a maximum value for the generation range may be defined as constant values. However, the values may change depending on the traffic type.

Here, the factory equipment characteristic information may be different although the traffic types are the same as each other. When operational importance of any piece of equipment, which is included in the factory equipment characteristic information, is high, the maximum value for the generation range thereof may be defined as a value twice lower than the maximum value for the generation range of another piece of equipment, that is, as ½, ¼, or the like thereof, in the range of natural numbers. Alternatively, the initial value of the generation range may be defined as a value twice lower than the initial value of the generation range of another piece of equipment, that is, as ½, ¼, or the like thereof, in the range of natural numbers.

When pieces of factory equipment having multiple traffic types are configured, parameter values may be set to have different channel access intervals, different initial values of a generation range, and different maximum values for the generation range. As an embodiment, for a traffic type having a small traffic size and a short transmission period, the channel access interval and the initial value of the generation range are set to the smallest values, and the maximum value for the generation range may also be set to a small value. For a traffic type having a small traffic size and a long transmission period, the initial value of the generation range may be set to the smallest value, and the maximum value for the generation range may be set to the largest value. For a traffic type having a large traffic size and a long transmission period, the initial value of the generation range may be set to a large value.

The configuration of the operation channel, the channel access parameters, and the like may be required to be changed from the initial values or to be modified depending on the situation of the factory, the factory equipment, or the like. Accordingly, after the initial network parameters are configured, a process for dynamically changing the configuration values may be included. The configuration may be arbitrarily changed by an administrator.

In a method according to an embodiment, information about operation status is collected, and update may be performed to have a new parameter configuration based on the collected information. The operation status information may include monitoring information about frequencies used in the factory or the surrounding environment. Also, data acquired by collecting a traffic condition generated by factory equipment, statistical data acquired through primary processing of the collected data, or the like may be included. When the actually generated traffic condition does not match the traffic type used in the initial settings, the traffic type set for the factory equipment may be changed, or the traffic type table may be modified.

An embodiment of the overall network configuration procedure will be described below based on the above description.

Figure 7:
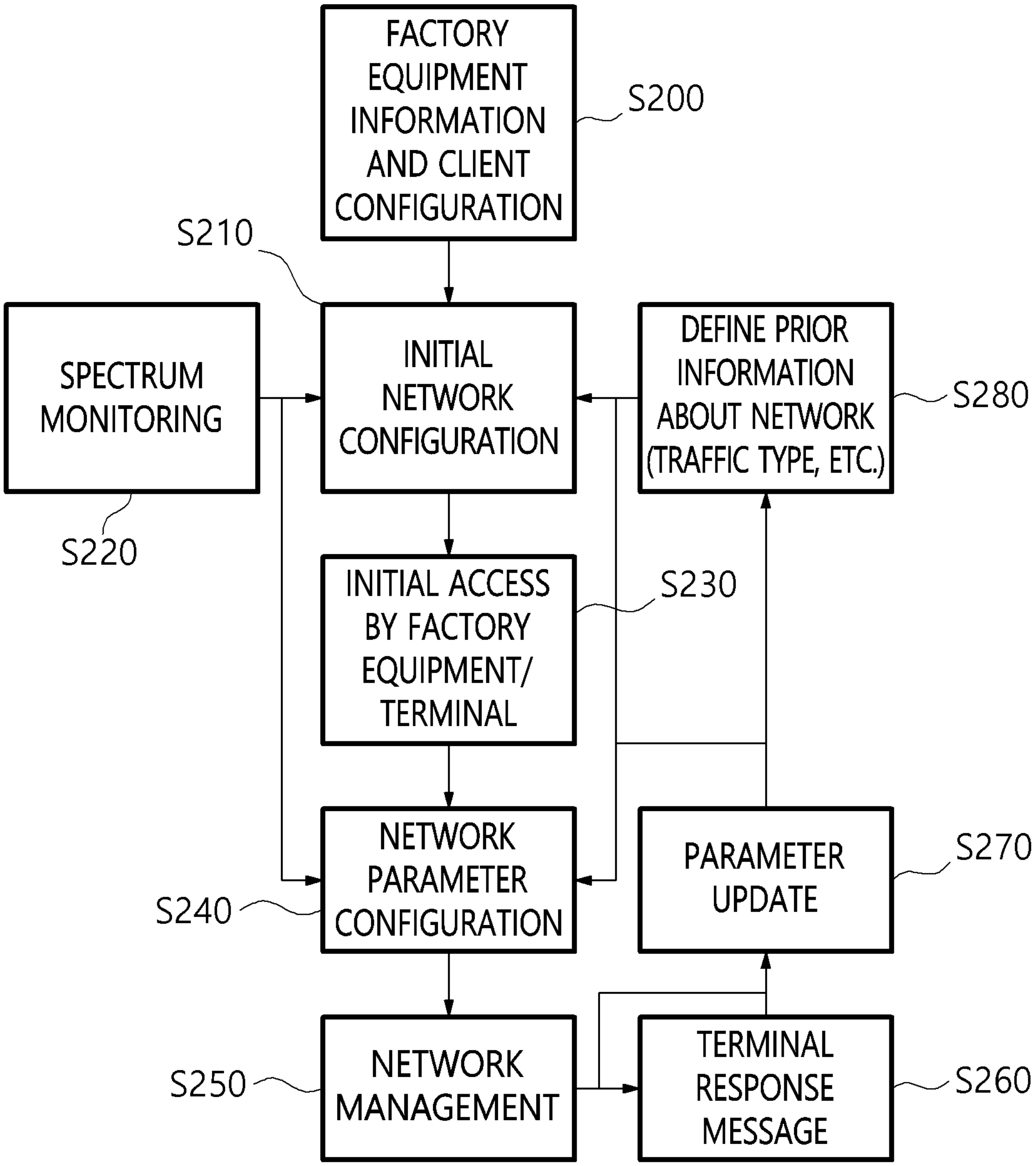
FIG. 7 is a flowchart illustrating a network configuration and update operation procedure according to an embodiment.

FIG. 7 is a flowchart illustrating a network configuration and update operation procedure according to an embodiment.

As illustrated in FIG. 7, factory equipment information and initial information required for configuring a network in a smart factory are formed in a client, which is included in or connected to factory equipment, in order to configure the network at step S200.

A network configuration apparatus forms an initial network in consideration of the configuration information of the factory equipment or the client at step S210. The initial network may be configured based only on the operation channel to be used by an AP and channel access parameters. Here, initial parameters may be configured using initially input traffic type information for the factory equipment. The biggest purpose of the initial network configuration is to form an initial communication link between the client and the AP. The client may access the network using the initial communication link at step S230, and factory equipment characteristic information and the like, including the factory equipment and client information, may be transferred to the AP.

The AP transfers the relevant information to the network configuration apparatus. Using the initial access information, the parameters of the initial network configuration may be changed. Here, the parameters are changed at step S240 so as to maximize the transmission quality and fairness according to the above-described embodiment of the parameter configuration. Subsequently, an actual smart factory network operation is performed at step S250. In this process, channel state information, response information such as reception error information, information about transmission of traffic transferred from the client to the AP, and the like may be collected from the client at step S260. The collected information may include state information about the use of a channel, which is collected using the spectrum monitoring function of the above-described USM function at step S220. The collected pieces of information may be used to update the parameters. Criteria for the parameter update may be defined such that the parameters are updated when channel quality or fairness fails to meet requirements, or the parameters may be updated depending on changes in the circumstances, including the spectrum use status, at step S270.

As an embodiment of the parameter update, the parameters may be changed in real time when a large number of errors occurs in the frames that the AP intends to receive from the clients. Here, it is determined that the errors occur because, with an increasing number of signals transmitted from the clients, a large number of conflict is caused when the set channel access parameters are used without change, so it is determined that it is necessary to update the parameters.

The collected information may be used for configuring prior information, such as a traffic type table, and the like, at step S280. After a new category is defined depending on the factory characteristic information, the newly defined prior information may be used for the initial network configuration in a factory classified as a category similar to the new category.

Hereinafter, an operation procedure between network configuration functions or devices will be described based on the upper-level operation procedure defined above.

Figure 8:
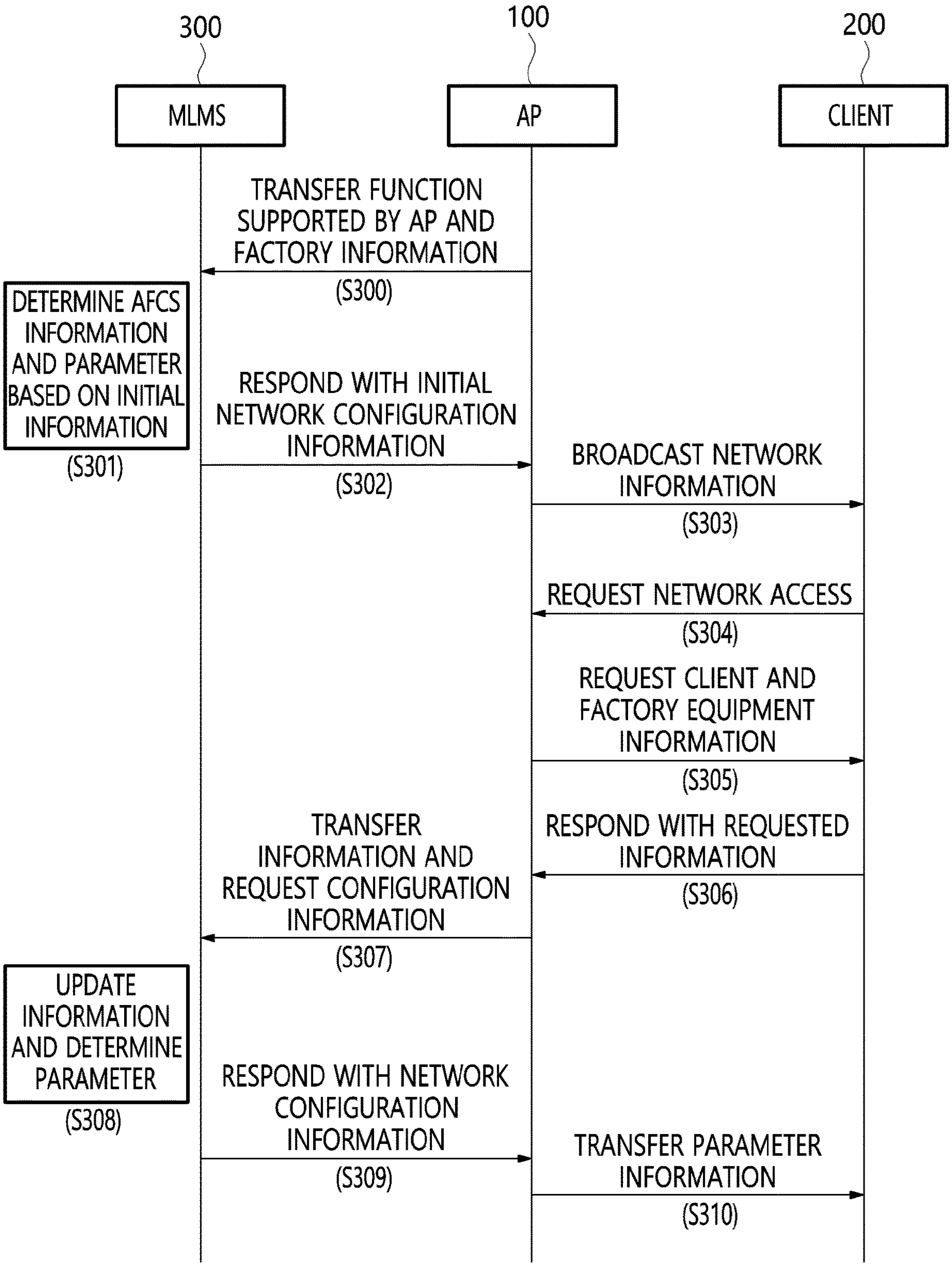
FIG. 8 is an exemplary view illustrating the entire procedure for configuring an initial network according to an embodiment.

FIG. 8 is an exemplary view illustrating the entire procedure for configuring an initial network according to an embodiment.

As illustrated in FIG. 8, an AP 100 accesses a network configuration apparatus 300 after it is powered on. Here, one or more pieces of information, including information about functions supported by the AP 100, factory equipment information, information about an installation location in a factory, and the like, may be transferred at step S300.

The network configuration apparatus 300 may determine Automated Frequency Coordination System (AFCS) information and initial-information-based parameters using the information received from the AP 100 at step S301. The network configuration apparatus 300 may transfer information that is required in order for the AP 100 to configure an initial network at step S302.

Based on the information, the AP 100 configures operation channels, channel access parameters, and the like, and, using a beacon or the like, the AP 100 broadcasts the information to a client 200 that intends to access the AP 100 at step S303.

The client 200 receives the information and accesses the AP 100, thereby requesting participation in the network configuration at step S304. Here, in response to the request for the network access, the AP 100 may request information required for the network configuration from the client 200 at step S305. Here, the information may include factory equipment characteristic information.

The client 200 may reply to the request for the information from the AP 100 at step S306. In another embodiment, the client may transfer both the network access request and information required for the network configuration to the AP 100 at once.

The AP 100 may request parameters required for the network configuration from the network configuration apparatus 300 by transferring the information received from the client 200 to the network configuration apparatus 300 at step S307. The network configuration apparatus 300 may update network configuration parameters based on the collected information at step S308. The updated information is transferred to the AP 100 at step S309, and the AP 100 may transfer the same to the client 200 at step S310. Here, the AP 100 may alternatively transfer parameters that are arbitrarily determined thereby based on the initial network configuration information, which is received from the network configuration apparatus 300 at first, to the client 200 without performing steps S307, S308, and S309.

Hereinafter, a procedure of parameter update operations performed after the client receives parameters set through an initial network configuration will be described.

Figure 9:
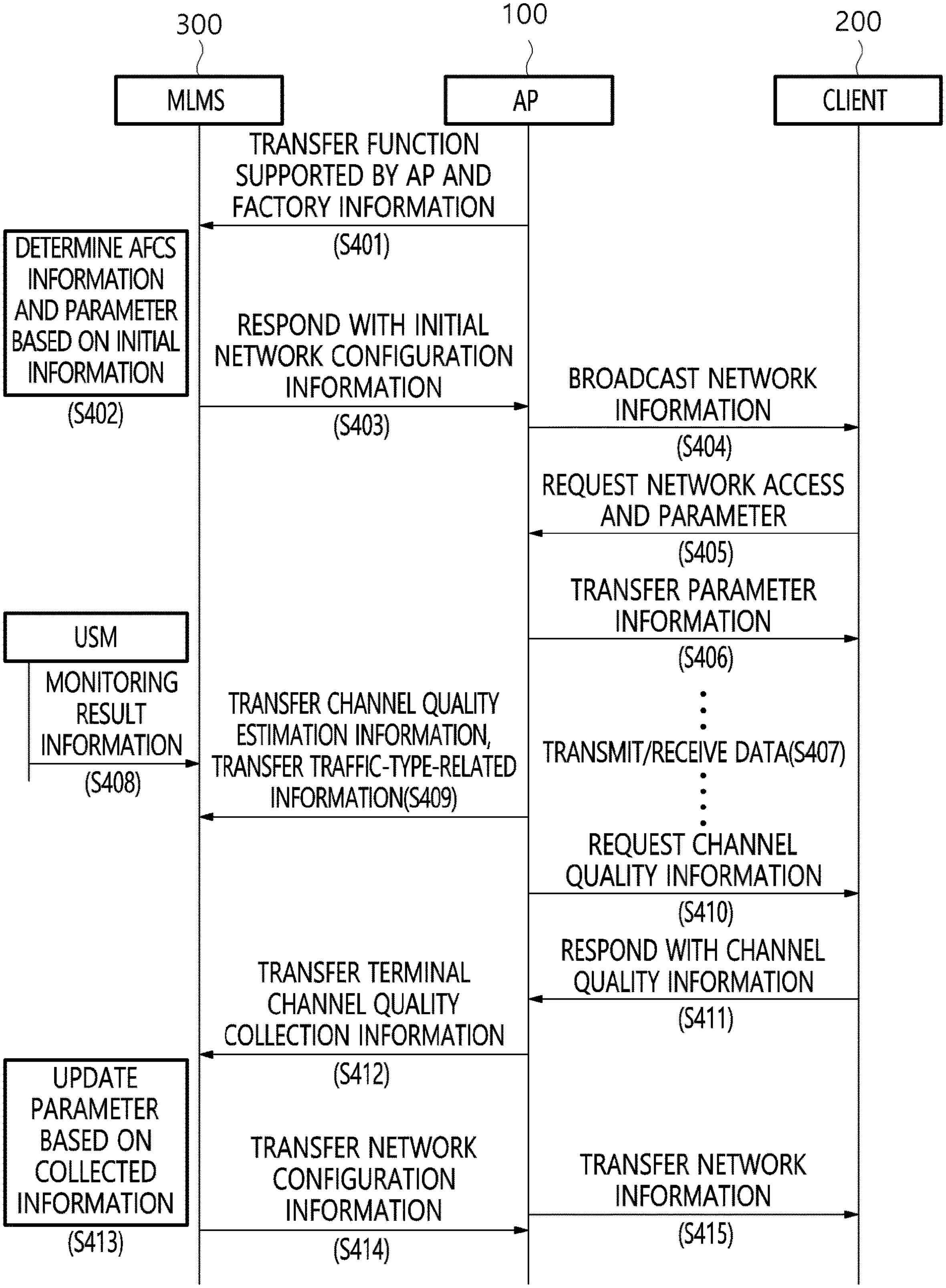
FIG. 9 is an exemplary view illustrating the entire procedure for configuring a network through the update of parameters according to an embodiment.

FIG. 9 is an exemplary view illustrating the entire procedure for configuring a network through the update of parameters according to an embodiment.

As illustrated in FIG. 9, an AP 100 may transfer information about functions supported thereby and factory information to a network configuration apparatus 300 at step S401. The network configuration apparatus 300 may determine AFCS information and initial-information-based parameters at step S402. The network configuration apparatus 300 may transfer initial network configuration information to the AP 100 in response to a request from the AP 100 at step S403.

The AP 100 may broadcast the network information to a client 200 at step S404. The client 200 may transfer a request for network access and a request for parameters to the AP 100 at step S405. The AP 100 may transfer the parameter information to the client 200 at step S406.

After the AP 100 and the client 200 finish the initial access procedure as described above, they may transmit and receive data at step S407.

In the process of transmitting and receiving data or after the process, a USM device collects information about the use of a channel while monitoring the operation channel, and directly transfers the information to the network configuration apparatus 300 or transfers the information thereto via the AP 100 at step S408.

The AP 100 estimates channel quality using signals received from clients 200, and the estimated information may be transferred to the network configuration apparatus 300. Also, traffic generated by factory equipment is collected by the AP 100 using the client 200. The AP 100 may transfer information about the generated traffic to the network configuration apparatus 300 directly or after processing the same at step S409.

In another embodiment, the AP 100 merely transfers information about the generated traffic to the network configuration apparatus 300, and traffic information of each piece of factory equipment may be estimated in the network configuration apparatus 300.

The AP 100 may directly request channel quality information from the client 200 at step S410. Here, the information may include the strength of a received signal on the operation channel or the reception signal error rate of a terminal. The client 200 may reply to the request for the channel quality information from the AP 100 at step S411.

The AP 100 may transfer the terminal channel quality information collected from the respective clients 200 to the network configuration apparatus 300 at step S412. The network configuration apparatus 300 may combine the pieces of collected information and update the network configuration parameters at step S413. The updated information is transferred to the AP 100 at step S414.

The AP 100 may change the network configuration using the updated parameters. Also, the AP 100 transfers information related to the client 200, among the updated parameters, to the client 200, thereby requesting a change and confirming the same at step S415.

The apparatus for determining network parameters or the apparatus for configuring a wireless network according to an embodiment may be implemented in a computer system including a computer-readable recording medium.

Figure 10:
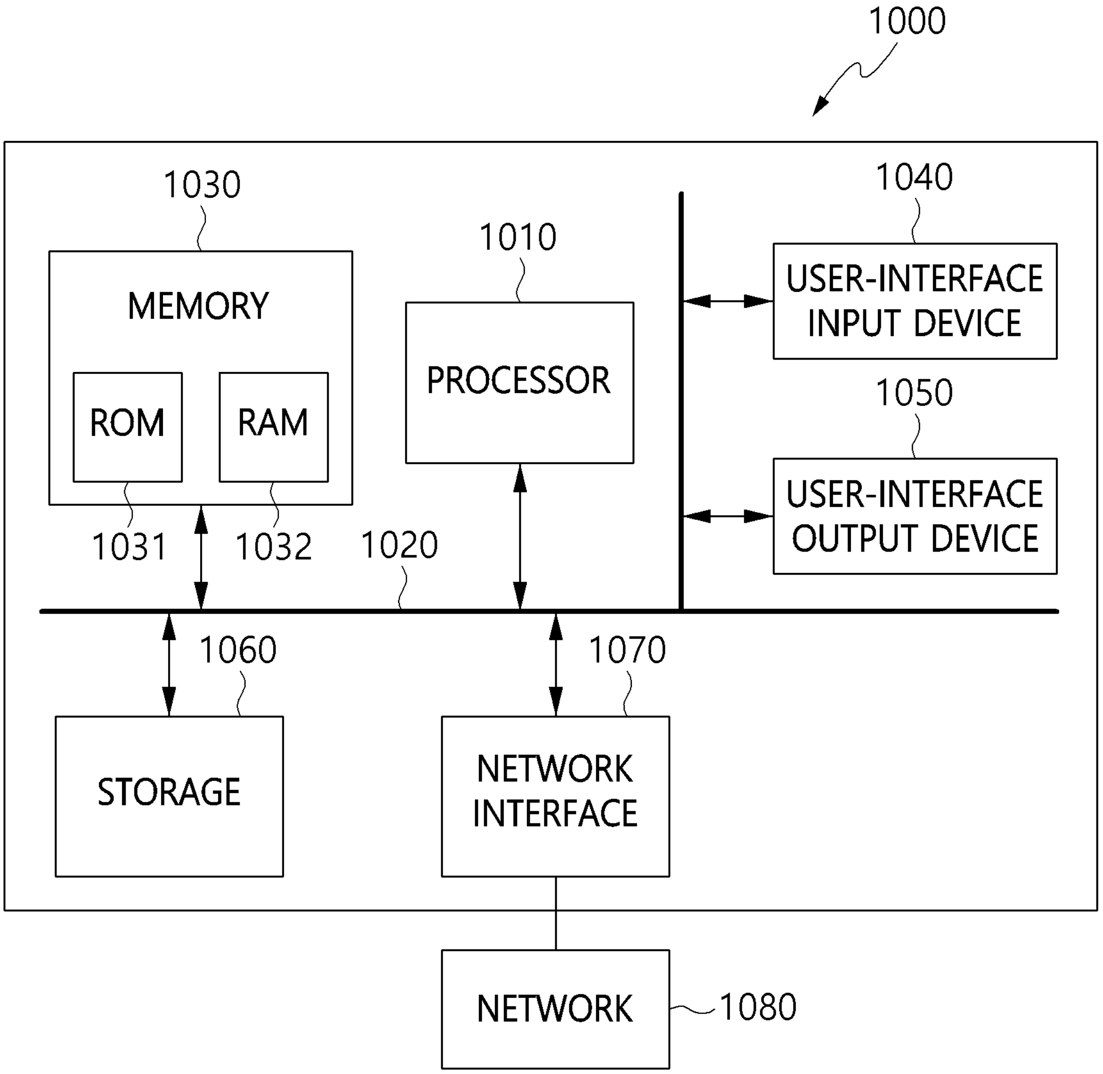
FIG. 10 is a block diagram illustrating the configuration of a computer system according to an embodiment.

FIG. 10 is a block diagram illustrating the configuration of a computer system according to an embodiment.

Referring to FIG. 10, the computer system 1000 according to an embodiment may include one or more processors 1010, memory 1030, a user-interface input device 1040, a user-interface output device 1050, and storage 1060, which communicate with each other via a bus 1020. Also, the computer system 1000 may further include a network interface 1070 connected to a network.

The processor 1010 may be a central processing unit or a semiconductor device for executing a program or processing instructions stored in the memory or the storage. The processor 1010 is a kind of central processing unit, and may control the overall operation of the apparatus for configuring a wireless network.

The processor 1010 may include all kinds of devices capable of processing data. Here, the 'processor' may be, for example, a data-processing device embedded in hardware, which has a physically structured circuit in order to perform functions represented as code or instructions included in a program. Examples of the data-processing device embedded in hardware may include processing devices such as a microprocessor, a central processing unit (CPU), a processor core, a multiprocessor, an application-specific integrated circuit (ASIC), a field-programmable gate array (FPGA), and the like, but are not limited thereto.

The memory 1030 may store various kinds of data for overall operation, such as a control program, and the like, for performing a method for configuring a wireless network according to an embodiment. Specifically, the memory may store multiple applications running in the apparatus for configuring a wireless network and data and instructions for operation of the apparatus for configuring a wireless network.

The memory 1030 and the storage 1060 may be storage media including at least one of a volatile medium, a non-volatile medium, a detachable medium, a non-detachable medium, a communication medium, or an information delivery medium, or a combination thereof. For example, the memory 1030 may include ROM 1031 or RAM 1032.

According to an embodiment, the computer-readable recording medium storing a computer program therein may contain instructions for making a processor perform a method including operations for receiving at least one of information about functions supported by an AP, factory equipment information, or information about an installation location in a factory, or a combination thereof, configuring an initial network based on at least one of the information about the functions supported by the AP, the factory equipment information, or the information about the installation location in the factory, or a combination thereof, transmitting information about the configuration of the initial network to the AP, updating parameter information required for a network configuration based on a network access request of a client and information required for the network configuration, which are received through the AP, and transferring the updated parameter information to the client via the AP.

According to an embodiment, a computer program stored in the computer-readable recording medium may include instructions for making a processor perform operations for receiving at least one of information about functions supported by an AP, factory equipment information, or information about an installation location in a factory, or a combination thereof, configuring an initial network based on at least one of the information about the functions supported by the AP, the factory equipment information, or the information about the installation location in the factory, or a combination thereof, transmitting information about the configuration of the initial network to the AP, updating parameter information required for a network configuration based on a network access request of a client and information required for the network configuration, which are received through the AP, and transferring the updated parameter information to the client via the AP.

An embodiment enables a network in a smart factory to be configured at low cost because a wireless network can be configured using unlicensed frequencies. Also, an embodiment may stably configure a wireless link and improve communication quality in spite of unlicensed spectrum characteristics such as competition-based channel access.

Specific implementations described in the present disclosure are embodiments and are not intended to limit the scope of the present disclosure. For conciseness of the specification, descriptions of conventional electronic components, control systems, software, and other functional aspects thereof may be omitted. Also, lines connecting components or connecting members illustrated in the drawings show functional connections and/or physical or circuit connections, and may be represented as various functional connections, physical connections, or circuit connections that are capable of replacing or being added to an actual device. Also, unless specific terms, such as "essential", "important", or the like, are used, the corresponding components may not be absolutely necessary.

Accordingly, the spirit of the present disclosure should not be construed as being limited to the above-described embodiments, and the entire scope of the appended claims and their equivalents should be understood as defining the scope and spirit of the present disclosure.

What is claimed is:

1. A method for configuring a wireless network, comprising:

receiving at least one of information about functions supported by an Access Point (AP), factory equipment information, or information about an installation location in a factory, or a combination thereof;

configuring an initial network based on at least one of the information about the functions supported by the AP, the factory equipment information, or the information about the installation location in the factory, or a combination thereof; and transmitting information about a configuration of the initial network to the AP, wherein, as part of configuring the initial network, the AP configures an operation channel and channel access parameters based on the information about the configuration of the initial network, and using a beacon, the AP transfers information to a client that intends to access the AP.

2. The method of claim 1, further comprising:

updating parameter information required for a network configuration based on a network access request of a client and information required for the network configuration, which are received through the AP; and transferring the updated parameter information to the client via the AP.

3. The method of claim 1, wherein the AP transfers parameter information arbitrarily determined based on the information about the configuration of the initial network to a client.

4. The method of claim 1, wherein configuring the initial network comprises setting network parameters including at least one of:

a channel access parameter for using an unlicensed frequency band;

wireless resource information including an unlicensed band and an operating channel in which a client operates; or client grouping.

5. The method of claim 1, wherein the client receives the information and accesses the AP, thereby making a request for access to a network configuration.

6. The method of claim 5, wherein, in response to the request for access, the AP makes a request for information required for the network configuration to the client.

7. The method of claim 6, wherein, in response to the request, the client transfers the information required for the network configuration to the AP.

8. The method of claim 5, wherein the client receives the information and transfers the request for access to the network configuration and information required for the network configuration to the AP by accessing the AP.

9. The method of claim 8, further comprising:

collecting channel monitoring result information during data transmission and reception between the AP and the client or after the data transmission and reception;

receiving channel quality estimation information of the client and traffic-type-related information;

receiving terminal channel quality collection information for the client, which is received in response to a request from the AP, from the AP; and updating parameters based on at least one of the channel monitoring result information, the channel quality estimation information of the client, the traffic-type-related information, or the terminal channel quality collection information, or a combination thereof.

10. The method of claim 9, further comprising:

transferring the updated parameters to the client via the AP.

11. An apparatus for configuring a wireless network, comprising:

memory in which a control program for configuring a wireless network is stored; and a processor for executing the control program stored in the memory, wherein the processor receives at least one of information about functions supported by an Access Point (AP), factory equipment information, or information about an installation location in a factory, or a combination thereof, configures an initial network based on at least one the information about the functions supported by the AP, the factory equipment information, or the information about the installation location in the factory, or a combination thereof, and transmits information about a configuration of the initial network to the AP, and wherein, as part of configuring the initial network, the AP configures an operation channel and channel access parameters based on the information about the configuration of the initial network, and using a beacon, the AP transfers information to a client that intends to access the AP.

12. The apparatus of claim 11, wherein the processor updates the parameter information required for the network configuration based on the network access request of the client and the information required for the network configuration, which are received through the AP, and transfers the updated parameter information to the client via the AP.

13. The apparatus of claim 11, wherein the AP transfers parameter information arbitrarily determined based on the information about the configuration of the initial network to the client.

14. The apparatus of claim 11, in configuring the initial network, the processor sets network parameters including at least one of:

a channel access parameter for using an unlicensed frequency band;

wireless resource information including an unlicensed band and an operation channel in which a client operates; or client grouping.

* * * * *